United States Patent

Kowalski

[11] Patent Number: 5,888,378
[45] Date of Patent: Mar. 30, 1999

[54] CATALYTIC CRACKING PROCESS

[75] Inventor: Jocelyn Anne Kowalski, Clarksboro, N.J.

[73] Assignee: Mobile Oil Corporation, Fairfax, Va.

[21] Appl. No.: 819,900

[22] Filed: Mar. 18, 1997

[51] Int. Cl.$^6$ .................................................. C10G 11/02
[52] U.S. Cl. ........................ 208/114; 208/113; 208/121; 208/216 PP
[58] Field of Search ............................... 268/114, 216 PP, 268/120

[56] References Cited

U.S. PATENT DOCUMENTS

| | | | |
|---|---|---|---|
| 4,601,993 | 7/1986 | Chu et al. .................................. | 502/66 |
| 4,828,679 | 5/1989 | Cormier, Jr. et al. ................... | 208/120 |
| 4,976,846 | 12/1990 | Long et al. ............................... | 208/114 |
| 5,110,776 | 5/1992 | Chitnis et al. ........................... | 208/114 |
| 5,308,475 | 5/1994 | Degnan et al. .......................... | 208/114 |
| 5,470,810 | 11/1995 | Degnan et al. ............................ | 502/64 |
| 5,472,594 | 12/1995 | Tsang et al. ............................. | 208/114 |

*Primary Examiner*—Helane Myers
*Attorney, Agent, or Firm*—Peter W. Roberts; Ronald J. Cier

[57] ABSTRACT

A process for catalytic cracking of a hydrocarbon feedstock feeds to produce an enhanced yield of $C_3$ to $C_5$ olefins comprises contacting the feedstock with a catalyst composition comprising a large pore molecular sieve having a pore size greater than about 7 Angstrom and an additive component comprising a phosphorus-containing zeolite having a Constraint Index of about 1 to about 12 and a crystal size less than 0.2 micron.

8 Claims, No Drawings

CATALYTIC CRACKING PROCESS

FIELD OF THE INVENTION

This invention relates to a process for catalytic cracking of hydrocarbon feeds to produce an enhanced yield of $C_3$ to $C_5$ olefins.

BACKGROUND TO THE INVENTION

Catalytic cracking, and particularly fluid catalytic cracking (FCC), is routinely used to convert heavy hydrocarbon feedstocks to lighter products, such as gasoline and distillate range fractions. There is, however, an increasing need to enhance the yield of light olefins, especially $C_3$ to $C_5$ olefins, in the product slate from catalytic cracking processes. For example, $C_3$ to $C_5$ olefins are useful in making ethers and alkylate which are in high demand as octane enhancing additives for gasoline.

Conventional processes for catalytic cracking of heavy hydrocarbon feedstocks to gasoline and distillate fractions typically use a large pore molecular sieve, such as zeolite Y, as the primary cracking component. It is also well-known to add a medium pore zeolite, such as ZSM-5, to the cracking catalyst composition to increase the octane number of the gasoline fraction. As disclosed in U.S. Pat. No. 4,828,679, conventional ZSM-5 cracking additives have a crystal size in excess of 0.2 micron since smaller crystal materials have reduced hydrothermal stability and hence rapidly lose activity when exposed to the high temperature steam generated during FCC regeneration.

U.S. Pat. No. 5,472,594 discloses that the yield of $C_4$ and $C_5$ olefins in catalytic cracking can be enhanced by adding a phosphorus-containing medium pore zeolite, such as ZSM-5, to a conventional zeolite Y cracking catalyst such that the weight ratio of phosphorus-containing medium pore zeolite to zeolite Y is in the range 0.005 to 0.10. U.S. Pat. No. 5,472,594 is, however, silent as to the crystal size of the ZSM-5.

According to the present invention, it has now been found that the addition of a phosphorus-containing, medium pore zeolite, such as ZSM-5, having a crystal size less than 0.1 micron to a conventional large pore molecular sieve cracking catalyst increases the yield of $C_3$ to $C_5$ olefins in the catalytic cracking of hydrocarbon feedstocks without significant loss in the aging characteristics of the medium pore additive.

SUMMARY OF THE INVENTION

Thus the present invention resides in a process for catalytic cracking of a hydrocarbon feedstock comprising contacting the feedstock with a catalyst composition comprising a large pore molecular sieve having a pore size greater than about 7 Angstrom and an additive component comprising a phosphorus-containing zeolite having a Constraint Index of about 1 to about 12 and a crystal size less than 0.2 micron.

Preferably, the zeolite of the additive component has a crystal size less than 0.1 micron and more preferably less than 0.05 micron.

Preferably, the zeolite of the additive component is ZSM-5.

DETAILED DESCRIPTION OF THE INVENTION

The present invention provides a process for converting feedstock hydrocarbon compounds to product hydrocarbon compounds of lower molecular weight than the feedstock hydrocarbon compounds. In particular, the present invention provides a process for catalytically cracking a hydrocarbon feed to a mixture of products comprising gasoline, alkylate, and $C_3$–$C_5$ olefins in the presence of a cracking catalyst under catalytic cracking conditions. Catalytic cracking units which are amenable to the process of the invention operate at temperatures from about 200° C. to about 870° C. and under reduced, atmospheric or superatmospheric pressure. The catalytic process can be either fixed bed, moving bed or fluidized bed and the hydrocarbon flow may be either concurrent or countercurrent to the catalyst flow. The process of the invention is particularly applicable to the Fluid Catalytic Cracking (FCC) or Thermofor Catalytic Cracking (TCC) processes.

The TCC process is a moving bed process and the catalyst is in the shape of pellets or beads having an average particle size of about one-sixty-fourth to one-fourth inch. Active, hot catalyst beads progress downwardly cocurrent with a hydrocarbon charge stock through a cracking reaction zone. The hydrocarbon products are separated from the coked catalyst and recovered, and the catalyst is recovered at the lower end of the zone and regenerated. Typically TCC conversion conditions include an average reactor temperature of about 450° C. to about 510° C.; catalyst/oil volume ratio of about 2 to about 7; reactor space velocity of about 1 to about 2.5 vol./hr./vol.; and recycle to fresh feed ratio of 0 to about 0.5 (volume).

The process of the invention is particularly applicable to fluid catalytic cracking (FCC), in which the cracking catalyst is typically a fine powder with a particle size of about 10 to 200 microns. This powder is generally suspended in the feed and propelled upward in a reaction zone. A relatively heavy hydrocarbon feedstock, e.g., a gas oil, is admixed with the cracking catalyst to provide a fluidized suspension and cracked in an elongated reactor, or riser, at elevated temperatures to provide a mixture of lighter hydrocarbon products. The gaseous reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbons from the spent catalyst prior to conveying the latter to a catalyst regenerator unit, an inert stripping gas, e.g., steam, is passed through the catalyst bed where it desorbs such hydrocarbons conveying them to the product recovery zone. The fluidizable catalyst is continuously circulated between the riser and the regenerator and serves to transfer heat from the latter to the former thereby supplying the thermal needs of the cracking reaction which is endothermic.

Typically, FCC conversion conditions include a riser top temperature of about 500° C. to about 595° C., preferably from about 520° C. to about 565° C., and most preferably from about 530° C. to about 550° C.; catalyst/oil weight ratio of about 3 to about 12, preferably about 4 to about 11, and most preferably about 5 to about 10; and catalyst residence time of about 0.5 to about 15 seconds, preferably about 1 to about 10 seconds.

The hydrocarbon feedstock to be cracked may include, in whole or in part, a gas oil (e.g., light, medium, or heavy gas oil) having an initial boiling point above 204° C., a 50% point of at least 260° C. and an end point of at least 315° C. The feedstock may also include vacuum gas oils, thermal oils, residual oils, cycle stocks, whole top crudes, tar sand oils, shale oils, synthetic fuels, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 400° C. must be carried out under vacuum in order to avoid thermal cracking. The boiling temperatures utilized herein are expressed for convenience in terms of the boiling point corrected to atmospheric pressure. Resids or deeper cut gas oils with high metals contents can also be cracked using the process of the invention.

The catalyst composition used in the process of the invention comprises a large pore molecular sieve having a pore size greater than about 7 Angstrom as a primary cracking component and a medium pore zeolite having a Constraint Index of about 1 to about 12 as an additive component. Typically, the weight ratio of the medium pore zeolite to the large pore molecular sieve is about 0.005 to 0.50, preferably 0.01 to 0.25.

The primary cracking component may be any conventional large-pore molecular sieve having cracking activity including zeolite X (U.S. Pat. No. 2,882,442); REX; zeolite Y (U.S. Pat. No. 3,130,007); Ultrastable Y zeolite (USY) (U.S. Pat. No. 3,449,070); Rare Earth exchanged Y (REY) (U.S. Pat. No. 4,415,438); Rare Earth exchanged USY (REUSY); Dealuminated Y (DeAl Y) (U.S. Pat. No. 3,442,792; U.S. Pat. No. 4,331,694); Ultrahydrophobic Y (UFPY) (U.S. Pat. No. 4,401,556); and/or dealuminated silicon-enriched zeolites, e.g., LZ-210 (U.S. Pat. No. 4,678,765). Preferred are higher silica forms of zeolite Y. Zeolite ZK-5 (U.S. Pat. No. 3,247,195);, zeolite ZK-4 (U.S. Pat. No. 3,314,752); ZSM-20 (U.S. Pat. No. 3,972,983); zeolite Beta (U.S. Pat. No. 3,308,069) and zeolite L (U.S. Pat. Nos. 3,216,789; and 4,701,315). Naturally occurring zeolites such as faujasite, mordenite and the like may also be used. These materials may be subjected to conventional treatments, such as impregnation or ion exchange with rare earths to increase stability. The preferred large pore molecular sieve of those listed above is a zeolite Y, more preferably an REY, USY or REUSY.

Other suitable large-pore crystalline molecular sieves include pillared silicates and/or clays; aluminophosphates, e.g., ALPO4-5, ALPO4-8, VPI-5; silicoaluminophosphates, e.g., SAPO-5, SAPO-37, SAPO-31, SAPO40; and other metal aluminophosphates. These are variously described in U.S. Pat. Nos. 4,310,440; 4,440,871; 4,554,143; 4,567,029; 4,666,875; 4,742,033; 4,880,611; 4,859,314; and 4,791,083.

The additive catalyst is a medium pore zeolite having a Constraint Index (which is defined in U.S. Pat. No. 4,016,218) of about 1 to about 12. Suitable medium pore zeolites include ZSM-5 (U.S. Pat. Nos. 3,702,886 and Re. 29,948); ZSM-11 (U.S. Pat. No. 3,709,979); ZSM-12 (U.S. Pat. No. 4,832,449); ZSM-22 (U.S. Pat. No. 4,556,477); ZSM-23 (U.S. Pat. No. 4,076,842); ZSM-35 (U.S. Pat. No. 4,016,245); ZSM48 (U.S. Pat. No. 4,397,827); ZSM-57 (U.S. Pat. No. 4,046,685); PSH-3 (U.S. Pat. No. 4,439,409); and MCM-22 (U.S. Pat. No. 4,954,325) either alone or in combination. Preferably, the medium pore zeolite is ZSM-5.

The medium pore zeolite is required to be of a small crystal size, by which is meant that the maximum dimension of the crystals in any direction is less than 0.2 micron, preferably less than 0.1 micron and more preferably less than 0.5 micron. Most preferably, the crystal size is in the range 0.02–0.05 micron.

The medium pore zeolite employed in the process of the invention contains phosphorus present as a phosphorus compound, normally an oxide, in the finished catalyst. The amount of phosphorus, as measured on an elemental basis, may be between about 0.1 and about 10 wt.%, and preferably is between about 1 and 5 wt. %, based on the weight of the medium pore zeolite.

Incorporation of phosphorus in the medium pore zeolite is conveniently achieved by the methods described in U.S. Pat. Nos. 4,356,338, 5,110,776 and 5,231,064. Treatment with phosphorus-containing compounds can readily be accomplished by contacting the zeolite, either alone or in combination with a binder or matrix material, with a solution of an appropriate phosphorus compound, followed by drying and calcining to convert the phosphorus to its oxide form. Contact with the phosphorus-containing compound is generally conducted at a temperature of about 25° C. and about 125° C. for a time between about 15 minutes and about 20 hours. The concentration of the phosphorus in the contact mixture may be between about 0.01 and about 30 wt. %.

Representative phosphorus-containing compounds which may be used include derivatives of groups represented by $PX_3$, $RPX_2$, $R_2PX$, $R_3P$, $X_3PO$, $(XO)_3PO$, $(XO)_3P$, $R_3P=O$, $R_3P=S$, $RPO_2$, $RPS_2$, $RP(O)(OX)_2$, $RP(S)(SX)_2$, $R_2P(O)$ $OX$, $R_2P(S)SX$, $RP(OX)_2$, $RP(SX)_2$, $ROP(OX)_2$, $RSP(SX)_2$, $(RS)_2PSP(SR)_2$, and $(RO)_2POP(OR)_2$, where R is an alkyl or aryl, such as phenyl radical, and X is hydrogen, R, or halide. These compounds include primary, $RPH_2$, secondary, $R_2PH$, and tertiary, $R_3P$, phosphines such as butyl phosphine, the tertiary phosphine oxides, $R_3PO$, such as tributyl phosphine oxide, the tertiary phosphine sulfides, $R_3PS$, the primary, $RP(O)(OX)_2$, and secondary, $R_2P(O)OX$, phosphonic acids such as benzene phosphonic acid, the corresponding sulfur derivatives such as $RP(S)(SX)_2$ and $R_2P(S)SX$, the esters of the phosphonic acids such as dialkyl phosphonate, $(RO)_2P(O)H$, dialkyl alkyl phosphonates, $(RO)_2P(O)R$, and alkyl dialkylphosphinates, $(RO)P(O)R_2$; phosphinous acids, $R_2POX$, such as diethylphosphinous acid, primary, $(RO)P(OX)_2$, secondary, $(RO)_2POX$, and tertiary, $(RO)_3P$, phosphites, and esters thereof such as the monopropyl ester, alkyl dialkylphosphinites, $(RO)PR_2$, and dialkyl alkyphosphinite, $(RO)_2PR$, esters. Corresponding sulfur derivatives may also be employed including $(RS)_2P$ $(S)H$, $(RS)_2P(S)R$, $(RS)P(S)R_2$, $R_2PSX$, $(RS)P(SX)_2$, $(RS)_2PSX$, $(RS)_3P$, $(RS)PR_2$, and $(RS)_2PR$. Examples of phosphite esters include trimethylphosphite, triethylphosphite, diisopropylphosphite, butylphosphite, and pyrophosphites such as tetracthylpyrophosphate. The alkyl groups in the mentioned compounds preferably contain one to four carbon atoms.

Other suitable phosphorus-containing compounds include ammonium hydrogen phosphate, the phosphorus halides such as phosphorus trichloride, bromide, and iodide, alkyl phosphorodichloridites, $(RO)PCl_2$, dialkylphosphorochlorides, $(RO)_2PCl$, dialkylphosphinochloroidites, $R_2PCl$, alkyl alkylphosphonochloridates, $(RO)(R)P(O)Cl$, dialkyl phosphinochloridates, $R_2P(O)Cl$, and $RP(O)Cl_2$. Applicable corresponding sulfur derivatives include $(RS)PCl_2$, $(RS)_2PCl$, $(RS)(R)P(S)Cl$, and $R_2P(S)Cl$.

Particular phosphorus-containing compounds include ammonium phosphate, ammonium dihydrogen phosphate, diammonium hydrogen phosphate, diphenyl phosphine chloride, trimethylphosphite, phosphorus trichloride, phosphoric acid, phenyl phosphine oxychloride, trimethylphosphate, diphenyl phosphinous acid, diphenyl phosphinic acid, diethylchlorothiophosphate, methyl acid phosphate, and other alcohol-$P_2O_5$ reaction products.

After contacting with the phosphorus-contang compound, the zeolite may be dried and calcined to convert the phosphorus to an oxide form. Calcination can be carried out in an inert atmosphere or in the presence of oxygen, for example, in air at a temperature of about 150° to 750° C., preferably about 300° to 500° C., for at least 1 hour, preferably 3–5 hours.

The cracking catalyst will also normally contain one or more matrix or binder materials which are resistant to the temperatures and other conditions e.g., mechanical attrition, which occur during cracking. It is generally necessary that the catalysts be resistant to mechanical attrition, that is, the formation of fines which are small particles, e.g., less than 20 micron. The cycles of cracking and regeneration at high flow rates and temperatures, such as in an FCC process, have a tendency to break down the catalyst into fines, as compared with an average diameter of catalyst particles of about 60–90 microns. In an FCC process, catalyst particles range from about 10 to about 200 microns, preferably from about 20 to 120 microns. Excessive generation of catalyst fines increases the refiner's catalyst costs.

The matrix may fulfill both physical and catalytic functions. Matrix materials include active or inactive inorganic materials such as clays, and/or metal oxides such as alumina or silica, titania, zirconia, or magnesia. The metal oxide may be in the form of a sol or a gelatinous precipitate or gel.

Use of an active matrix material in conjunction with the molecular sieve component that is combined therewith, may enhance the conversion and/or selectivity of the overall catalyst composition in certain hydrocarbon conversion processes. Inactive materials may serve as diluents to control the amount of conversion in a given process so that products can be obtained economically and in an orderly fashion without employing other means for controlling the rate of reaction. These materials may be incorporated as naturally occurring clays to improve the attrition resistance of the catalyst under commercial operating conditions.

Naturally occurring clays which can be composited with the catalyst include the montmorillonite and kaolin families which include the subbentonites, and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, catalysts can be composited with a porous matrix material such as silica-alumina, silica-magnesia, silica-zirconia, silica-thoria, silica-beryllia, silica-titania, as well as ternary materials such as silica-alumina-thoria, silica-alumina-zirconia, silica-alumina-magnesia, silica-magnesia-zirconia. The matrix can be in the form of a cogel. A mixture of these components can also be used.

In general, the relative proportions of finely divided, crystalline molecular sieve component and inorganic oxide matrix vary widely, with the molecular sieve content ranging from about 1 to about 90 percent by weight, and more usually from about 2 to about 80 weight percent of the composite.

The invention will now be more particularly described with reference to the following Examples:

EXAMPLE 1

A first fluid catalyst additive containing about 36 wt % ZSM-5, with a crystal size of 0.2–0.5 micron, was prepared by spray drying an aqueous slurry. The slurry was prepared by mixing until smooth and homogeneous 27.0 parts clay (Thiele Kaolin), 22.6 parts water, 9.5 parts phosphoric acid, 169 parts of an aqueous slurry containing 21.7% ZSM-5, 2.5 parts alumina (Condea) which was blended with 17.2 parts water and peptized with 0.5 parts formic acid, and 24.5 parts silica sol (Nalco). The slurry was spray dried at an outlet temperature of 177° C. (350° F.) and then air calcined for two hours at 540° C. (1000° F.).

EXAMPLE 2

A second fluid catalyst additive containing about 36 wt % ZSM-5, with a crystal size in excess of 1 micron, was prepared by spray drying an aqueous slurry. The slurry was prepared by mixing until smooth and homogeneous 27.0 parts clay (Thiele Kaolin), 22.5 parts water, 9.5 parts phosphoric acid, 175.2 parts of an aqueous slurry containing 20.9 wt % ZSM-5, 2.5 parts alumina (Condea) which was blended with 17.2 parts water and peptized with 0.5 parts formic acid, and 24.5 parts silica sol (Nalco). The slurry was spray dried at an outlet temperature of 175° C. (347° F.) and then air calcined for two hours at 540° C. (1000° F.).

EXAMPLE 3

A third fluid catalyst additive containing about 36 wt % ZSM-5, with a crystal size of 0.02–0.05 micron, was prepared by spray drying an aqueous slurry. The slurry was prepared by mixing until smooth and homogeneous 27.0 parts clay (Thiele Kaolin), 17.1 parts water, 9.5 parts phosphoric acid, 176.4 parts of an aqueous slurry containing 20.8 wt % ZSM-5, 2.5 parts alumina (Condea) which was blended with 17.1 parts water and peptized with 0.5 parts formic acid, and 24.5 parts silica sol (Nalco). The slurry was spray dried at an outlet temperature of 174° C. (345° F.) and then air calcined for two hours at 540° C. (1000° F.).

EXAMPLE 4

The catalyst additives of Examples 1–3 were steam deactivated by treatment with 45% steam at 790° C. (1450° F.) and atmospheric pressure for 10 hours. The steamed additives were separately blended with the same base cracking catalyst containing about 20 wt % REUSY for catalytic evaluation as FCC additive catalysts. The additive level in each blend was 8 wt % and the ZSM-5:USY ratio in each blend was about 0.15. Each blend was evaluated in a fixed-fluidized bed unit at 516° C. (960° F.) for its ability to crack Joliet Sour Heavy Gas Oil (JSHGO) over a range of catalyst/oil ratios. The yield and octane performances of the catalysts blends are compared at an interpolated constant conversion of 70 vol % in Table 1. From Table 1, it will be seen that the blend containing the small crystal ZSM-5 of Example 3 gave higher yields of $C_3$ to $C_5$ olefins and a higher ratio of $C_3$ to $C_5$ olefin to equivalent saturated hydrocarbon than the blends containing the larger crystal ZSM-5 of Examples 1 and 2.

TABLE 1

| Catalyst | Example 1 | Example 2 | Example 3 |
| --- | --- | --- | --- |
| Conversion, % vol | 70.0 | 70.0 | 70.0 |
| Conversion, % wt | 66.5 | 66.7 | 66.6 |
| $C_5^+$ gasoline, % wt | 31.8 | 36.4 | 29.2 |
| $C_5^+$ gasoline, % vol | 38.0 | 44.7 | 35.9 |
| Light gas, % wt | 4.1 | 3.1 | 5.2 |
| Total $C_3$, % vol | 22.9 | 19.9 | 24.6 |
| Total $C_4$, % vol | 19.9 | 18.0 | 18.1 |
| Coke, % wt | 5.5 | 5.0 | 7.21 |
| LFO, % wt | 26.2 | 25.3 | 21.4 |
| HFO, % wt | 7.3 | 8.0 | 11.9 |

TABLE 1-continued

| Catalyst | Example 1 | Example 2 | Example 3 |
|---|---|---|---|
| G + D, % wt | 58.1 | 81.7 | 50.6 |
| Alkylate, % vol | 42.4 | 37.4 | 46.7 |
| Gasoline + alkylate, % vol | 80.4 | 82.1 | 82.6 |
| Outside i-$C_4$ for alky, % | | | 24.2 |
| n-$C_5$, % vol | 0.2 | 0.2 | 0.4 |
| i-$C_5$, % vol | 6.0 | 6.3 | 4.3 |
| $C_5^=$, % vol | 3.6 | 3.0 | 3.9 |
| n-$C_4$, % vol | 1.4 | 1.6 | 1.4 |
| n-$C_4$, % wt | 0.9 | 1.0 | 0.9 |
| i-$C_4$, % vol | 10.3 | 9.1 | 8.1 |
| i-$C_4$, % wt | 6.2 | 5.5 | 4.9 |
| $C_4^=$, % vol | 8.2 | 7.3 | 8.6 |
| $C_4^=$, % wt | 5.3 | 4.8 | 5.6 |
| $C_3$, % vol | 5.4 | 4.6 | 4.9 |
| $C_3$, % wt | 2.9 | 2.5 | 2.7 |
| $C_3^=$, % vol | 17.5 | 15.3 | 19.7 |
| $C_3^=$, % wt | 9.7 | 8.6 | 11.0 |
| $C_2$, % wt | 0.7 | 0.6 | 0.9 |
| $C_2^=$, % wt | 1.8 | 1.1 | 1.3 |
| $C_1$, % wt | 0.7 | 0.6 | 0.9 |
| $H_2$, % wt | 0.1 | 0.1 | 0.19 |
| $H_2S$, % wt | 0.9 | 0.7 | 1.9 |
| $C_3^=/C_3$, mol/mol | 3.3 | 3.4 | 4.1 |
| $C_4^=/C_4$, mol/mol | 0.7 | 0.7 | 0.9 |
| $C_5^=/C_5$, mol/mol | 0.6 | 0.4 | 0.9 |
| Crackability | 2.3 | 2.3 | 2.3 |
| Hydrogen Factor | | | 71 |

EXAMPLE 5

Example 4 was repeated but with the catalyst blend produced from the phosphorus-containing, small crystal ZSM-5 of Example 3 being compared with a similar blend containing small crystal ZSM-5 without phosphorus and with a blend containing the 0.2–0.5 micron ZSM-5 of Example 1 again without phosphorus. The results are given in Table 2 which shows that the blend of Example 3 gave a best combination of $C_3$ to $C_5$ olefin yield and $C_3$ to $C_5$ olefin/$C_3$ to $C_5$ paraffin ratio of the the three catalysts tested. The blend containing the small crystal ZSM-5 without phosphorus also exhibited rapid aging and loss of activity.

TABLE 2

| ZSM-5 additive | Example 1 (No Phosphorus) | Example 3 (No Phosphorus) | Example 3 (Phosphorus) |
|---|---|---|---|
| Conversion, % vol | 70.0 | 70.0 | 70.0 |
| Conversion, % wt | 66.7 | 67.0 | 66.6 |
| $C_5^+$ gasoline, % wt | 27.8 | 37.6 | 29.2 |
| $C_5^+$ gasoline, % vol | 33.8 | 46.1 | 35.9 |
| Light gas, % wt | 5.6 | 3.9 | 5.2 |
| Total $C_3$, % vol | 23.7 | 14.7 | 24.6 |
| Total $C_4$, % vol | 21.1 | 17.3 | 18.1 |
| Coke, % wt | 6.94 | 6.54 | 7.21 |
| LFO, % wt | 21.5 | 22.8 | 21.4 |
| HFO, % wt | 11.9 | 10.2 | 11.9 |
| G + D, % wt | 49.2 | 60.4 | 50.6 |
| Alkylate, % vol | 46.3 | 33.4 | 46.7 |

TABLE 2-continued

| ZSM-5 additive | Example 1 (No Phosphorus) | Example 3 (No Phosphorus) | Example 3 (Phosphorus) |
|---|---|---|---|
| Gasoline + alkylate, % vol | 80.1 | 79.4 | 82.6 |
| Outside i-$C_4$ for alky, % vol | 22.0 | 15.2 | 24.2 |
| n-$C_5$, % vol | 0.4 | 0.5 | 0.4 |
| i-$C_5$, % vol | 4.0 | 5.9 | 4.3 |
| $C_5^=$, % vol | 3.2 | 3.9 | 3.9 |
| n-$C_4$, % vol | 1.6 | 1.1 | 1.4 |
| n-$C_4$, % wt | 1.0 | 0.7 | 0.9 |
| i-$C_4$, % vol | 10.0 | 7.6 | 8.1 |
| i-$C_4$, % wt | 6.0 | 4.6 | 4.9 |
| $C_4^=$, % vol | 9.5 | 8.5 | 8.6 |
| $C_4^=$, % wt | 6.2 | 5.5 | 5.6 |
| $C_3$, % vol | 5.2 | 3.2 | 4.9 |
| $C_3$, % wt | 2.8 | 1.7 | 2.7 |
| $C_3^=$, % vol | 18.5 | 11.6 | 19.7 |
| $C_3^=$, % wt | 10.3 | 6.5 | 11.0 |
| $C_2$, % wt | 0.9 | 0.7 | 0.9 |
| $C_2^=$, % wt | 2.0 | 0.7 | 1.3 |
| $C_1$, % wt | 0.9 | 0.8 | 0.9 |
| $H_2$, % wt | 0.21 | 0.18 | 0.19 |
| $H_2S$, % wt | 1.61 | 1.49 | 1.9 |
| $C_3^=/C_3$, mol/mol | 3.6 | 3.7 | 4.1 |
| $C_4^=/C_4$, mol/mol | 0.8 | 1.0 | 0.9 |
| $C_5^=/C_5$, mol/mol | 0.7 | 0.6 | 0.9 |
| Crackability | 2.3 | 2.3 | 2.3 |
| Hydrogen Factor | 65 | 94 | 71 |

I claim:

1. A process for catalytic cracking of a hydrocarbon feedstock comprising contacting the feedstock with a catalyst composition comprising a large pore molecular sieve having a pore size greater than about 7 Angstrom and an additive component comprising phosphorus and ZSM-5 having a crystal size less than 0.2 micron.

2. The process of claim 1, wherein the zeolite of the additive component has a crystal size less than 0.1 micron.

3. The process of claim 1, wherein the zeolite of the additive component has a crystal size less than 0.05 micron.

4. The process of claim 1, wherein the large pore molecular sieve is zeolite Y.

5. The process of claim 1, wherein the weight ratio of the medium pore zeolite to the large pore molecular sieve is about 0.005 to 0.50.

6. The process of claim 1, wherein the weight ratio of the medium pore zeolite to the large pore molecular sieve is about 0.01 to 0.25.

7. The process of claim 1, wherein the zeolite of the additive component contains between about 0.1 and about 10 wt. % phosphorus, as measured on an elemental basis.

8. The process of claim 1, wherein the zeolite of the additive component contains between about 1 and about 5 wt. % phosphorus, as measured on an elemental basis.

* * * * *

UNITED STATES PATENT AND TRADEMARK OFFICE
CERTIFICATE OF CORRECTION

PATENT NO.    : 5,888,378

DATED         : March 30, 1999

INVENTOR(S)   : Kowalski

It is certified that error appears in the above-identified patent and that said Letters Patent is hereby corrected as shown below:

Title page, item [73],
The Assignee (Mobil Oil Corporation) is spelled incorrectly.

"Mobile" should read ---Mobil---

Signed and Sealed this

Twenty-fourth Day of August, 1999

Attest:

Q. TODD DICKINSON

Attesting Officer

Acting Commissioner of Patents and Trademarks